(12) United States Patent
Igari

(10) Patent No.: US 11,290,451 B2
(45) Date of Patent: Mar. 29, 2022

(54) INFORMATION PROCESSING APPARATUS, MANAGEMENT SERVER, SERVICE PROVISION SERVER, IMAGE PROCESSING APPARATUS, AND INFORMATION PROCESSING SYSTEM

(71) Applicant: CANON KABUSHIKI KAISHA, Tokyo (JP)

(72) Inventor: Toshinori Igari, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 639 days.

(21) Appl. No.: 16/014,705

(22) Filed: Jun. 21, 2018

(65) Prior Publication Data
US 2019/0007404 A1 Jan. 3, 2019

(30) Foreign Application Priority Data
Jun. 30, 2017 (JP) .............................. JP2017-129183

(51) Int. Cl.
*H04L 29/00* (2006.01)
*H04L 29/06* (2006.01)
(Continued)

(52) U.S. Cl.
CPC ........ *H04L 63/0876* (2013.01); *G06F 21/608* (2013.01); *H04L 41/0806* (2013.01); *H04L 63/0807* (2013.01); *H04L 63/10* (2013.01)

(58) Field of Classification Search
CPC ... G06F 21/608; H04L 63/0876; H04L 63/10; H04L 63/0807; H04L 41/0806; H04L 63/0806
See application file for complete search history.

(56) References Cited

U.S. PATENT DOCUMENTS 8,850,551 B2 * 9/2014 Abe ..................... G06F 21/44
726/9
9,639,316 B2 5/2017 Mizoguchi
(Continued)

FOREIGN PATENT DOCUMENTS

| JP | 2012-113696 | 6/2012 |
| JP | 2015-11438 A | 1/2015 |
| JP | 2016-7704 | 1/2016 |

OTHER PUBLICATIONS

Japanese Search Report dated May 11, 2021 in corresponding Japanese Application No. 2017-129183 (English translation included).

*Primary Examiner* — Don G Zhao
(74) *Attorney, Agent, or Firm* — Venable LLP

(57) ABSTRACT

An information processing apparatus includes: an instruction unit configured to instruct an image processing apparatus to request a management server to issue identification information; an identification information obtaining unit configured to obtain, from the image processing apparatus, the identification information issued to the image processing apparatus by the management server; an identification information transmission unit configured to transmit the obtained identification information to a service provision server; a request reception unit configured to receive a request to transmit user information necessary for using a predetermined service from the service provision server as a response to the transmission of the identification information; and a user information transmission unit configured to transmit the user information to the service provision server in response to the received transmission request.

9 Claims, 15 Drawing Sheets

(51) Int. Cl.
*G06F 21/60* (2013.01)
*H04L 41/0806* (2022.01)

(56) References Cited

U.S. PATENT DOCUMENTS

| | | | |
|---|---|---|---|
| 9,860,231 B2* | 1/2018 | Miyazawa | H04L 63/102 |
| 2006/0059570 A1* | 3/2006 | Kawabuchi | G06F 21/608 |
| | | | 726/28 |
| 2006/0197972 A1* | 9/2006 | Hayashi | H04N 1/00846 |
| | | | 358/1.14 |
| 2008/0034403 A1* | 2/2008 | Kakigi | G06F 3/1288 |
| | | | 726/1 |
| 2008/0091736 A1* | 4/2008 | Sawayanagi | H04L 63/1416 |
| 2009/0279117 A1* | 11/2009 | Kondo | H04N 1/00204 |
| | | | 358/1.14 |
| 2010/0079785 A1* | 4/2010 | Emori | H04L 67/12 |
| | | | 358/1.14 |
| 2011/0126270 A1* | 5/2011 | Sato | G06F 21/608 |
| | | | 726/4 |
| 2011/0255121 A1* | 10/2011 | Takeuchi | G06F 21/608 |
| | | | 358/1.14 |
| 2012/0110642 A1* | 5/2012 | Grassel | G06Q 10/101 |
| | | | 726/4 |
| 2012/0327457 A1* | 12/2012 | Hoshina | G06F 21/608 |
| | | | 358/1.15 |
| 2013/0073859 A1* | 3/2013 | Carlson | G06Q 20/325 |
| | | | 713/176 |
| 2013/0198294 A1* | 8/2013 | Gallagher | H04L 63/08 |
| | | | 709/206 |
| 2013/0215455 A1* | 8/2013 | Armstrong | G06F 21/608 |
| | | | 358/1.15 |
| 2013/0246528 A1* | 9/2013 | Ogura | H04L 67/02 |
| | | | 709/204 |
| 2013/0262857 A1* | 10/2013 | Neuman | H04L 63/18 |
| | | | 713/155 |
| 2014/0268230 A1* | 9/2014 | Kosuda | G06F 3/1203 |
| | | | 358/1.15 |
| 2015/0007279 A1 | 1/2015 | Hattori | |
| 2015/0101023 A1* | 4/2015 | Shinoda | H04L 63/0807 |
| | | | 726/4 |
| 2015/0153981 A1* | 6/2015 | Iwasaki | G06F 3/1292 |
| | | | 358/1.14 |
| 2015/0237043 A1* | 8/2015 | Nishi | H04L 63/0807 |
| | | | 726/9 |
| 2015/0293732 A1* | 10/2015 | Kyoo | G06F 21/608 |
| | | | 358/1.14 |
| 2016/0055477 A1* | 2/2016 | Guerin | G07F 9/001 |
| | | | 705/21 |
| 2016/0142585 A1* | 5/2016 | To | H04N 1/00477 |
| | | | 358/1.14 |
| 2016/0212297 A1* | 7/2016 | Nagasawa | H04N 1/32101 |
| 2017/0093865 A1* | 3/2017 | Watanabe | H04L 63/0876 |
| 2017/0163636 A1* | 6/2017 | Nishida | G06F 21/445 |
| 2017/0176910 A1* | 6/2017 | Tokunaga | G03G 15/5087 |
| 2017/0255915 A1* | 9/2017 | Chandrasekaran | H04L 63/101 |

* cited by examiner

| REGISTRATION PROGRAM | ☒ |
|---|---|

| PRINTER NAME | IP ADDRESS |
|---|---|
| MODEL 100 | 192.168.0.1 |
| MODEL 100 | 192.168.0.2 |
| MODEL 700 | 192.168.0.3 |

701

702 REGISTER

FIG.7

| PRINTER ID | ISSUANCE TIME AND DATE | STATUS |
|---|---|---|
| 00001 | 2017/06/30 12:34:56 | UNREGISTERED |
| | | |
| | | |

FIG.8A

| EMAIL ADDRESS | PASSWORD | PRINTER ID |
|---|---|---|
| user@example.com | abcd1234 | 00001 |
| | | |
| | | |

| PRINTER ID | ISSUANCE TIME AND DATE | STATUS |
|---|---|---|
| 00001 | 2017/06/30 12:34:56 | REGISTERED |
|  |  |  |
|  |  |  |

1302

| PRINTER ID | ISSUANCE TIME AND DATE | STATUS |
|---|---|---|
| 00001 | 2017/06/30 12:34:56 | REGISTERED |
| 00002 | 2017/07/30 12:34:56 | UNREGISTERED |
|  |  |  |

1303

| PRINTER ID | ISSUANCE TIME AND DATE | STATUS |
|---|---|---|
| 00002 | 2017/07/30 12:34:56 | REGISTERED |
|  |  |  |
|  |  |  |

FIG.13

| PRINTER ID | ISSUANCE TIME AND DATE | STATUS |
|---|---|---|
| 00001 | 2017/06/30 12:34:56 | UNREGISTERED |
| | | |
| | | |

1401

| PRINTER ID | ISSUANCE TIME AND DATE | STATUS |
|---|---|---|
| 00001 | 2017/06/30 12:34:56 | UNREGISTERED |
| 00003 | 2017/07/01 12:34:56 | UNREGISTERED |
| | | |

1402

| PRINTER ID | ISSUANCE TIME AND DATE | STATUS |
|---|---|---|
| 00003 | 2017/07/01 12:34:56 | REGISTERED |
| | | |
| | | |

INFORMATION PROCESSING APPARATUS, MANAGEMENT SERVER, SERVICE PROVISION SERVER, IMAGE PROCESSING APPARATUS, AND INFORMATION PROCESSING SYSTEM

BACKGROUND OF THE INVENTION

Field of the Invention

The present invention relates to an information processing technique of registering an apparatus to which to provide a web service.

Description of the Related Art

In recent years, multi-function printers (MFPs) capable of using web services provided on the Internet have been proposed. For example, an MFP capable of using an online storage service can upload scanned image data, obtained by scanning a document, to a storage on a network and download print data from the storage on the network. Also, an MFP capable of using a loyalty program, for example, can add points granted according to the amounts of inks used and the number of times ink tanks are replaced to a point balance managed under an account on the network.

For an MFP to use a web service, the MFP needs to be authenticated by a service provision server that provides the web service and registered in the service provision server as an apparatus to which to provide the web service. Japanese Patent Laid-Open No. 2012-113696 discloses a technique in which an access token is issued to an MFP equipped with no web browser from a service provision server in response to input of a provisional registration ID obtained with a terminal apparatus (information processing apparatus) into the MFP. Japanese Patent Laid-Open No. 2016-007704 discloses a technique in which a user code obtained from a service provision server is printed with an MFP, and an access token is issued to the MFP from the service provision server in response to the user referring to the printed information and inputting the user code into an information processing apparatus.

SUMMARY OF THE INVENTION

An object of the present invention is to enable easy registration of an apparatus to which to provide a web service.

An information processing apparatus of the present invention is an information processing apparatus including: an instruction unit configured to instruct an image processing apparatus to request a management server to issue identification information; an identification information obtaining unit configured to obtain, from the image processing apparatus, the identification information issued to the image processing apparatus by the management server; an identification information transmission unit configured to transmit the obtained identification information to a service provision server; a request reception unit configured to receive a request to transmit user information necessary for using a predetermined service from the service provision server as a response to the transmission of the identification information; and a user information transmission unit configured to transmit the user information to the service provision server in response to the received transmission request.

Further features of the present invention will become apparent from the following description of exemplary embodiments with reference to the attached drawings.

BRIEF DESCRIPTION OF THE DRAWINGS

FIG. 7 is a diagram illustrating an exemplary GUI displaying a list of MFPs in embodiment 1;

FIGS. 8A and 8B are schematic diagrams illustrating exemplary contents of a printer ID management database and a user information management database in embodiment 1;

FIG. 13 is a schematic diagram illustrating exemplary contents of a printer ID management database in embodiment 3;

FIG. 14 is a schematic diagram illustrating exemplary contents of a printer ID management database in embodiment 4.

DESCRIPTION OF THE EMBODIMENTS

The technique in Japanese Patent Laid-Open No. 2012-113696 requires the user to input a provisional registration ID obtained with an information processing apparatus into an MFP's operation unit. Also, the technique in Japanese Patent Laid-Open No. 2016-007704 requires the user to refer to printed information and input a user code into an information processing apparatus. Thus, a problem with conventional techniques is that registration of an apparatus to which to provide a web service is complicated.

Embodiments of the present invention will be described below with reference to the drawings. Note that the configurations described in this embodiment are mere examples and are not intended to limit the scope of the present invention to those.

Embodiment 1

Figure 1:
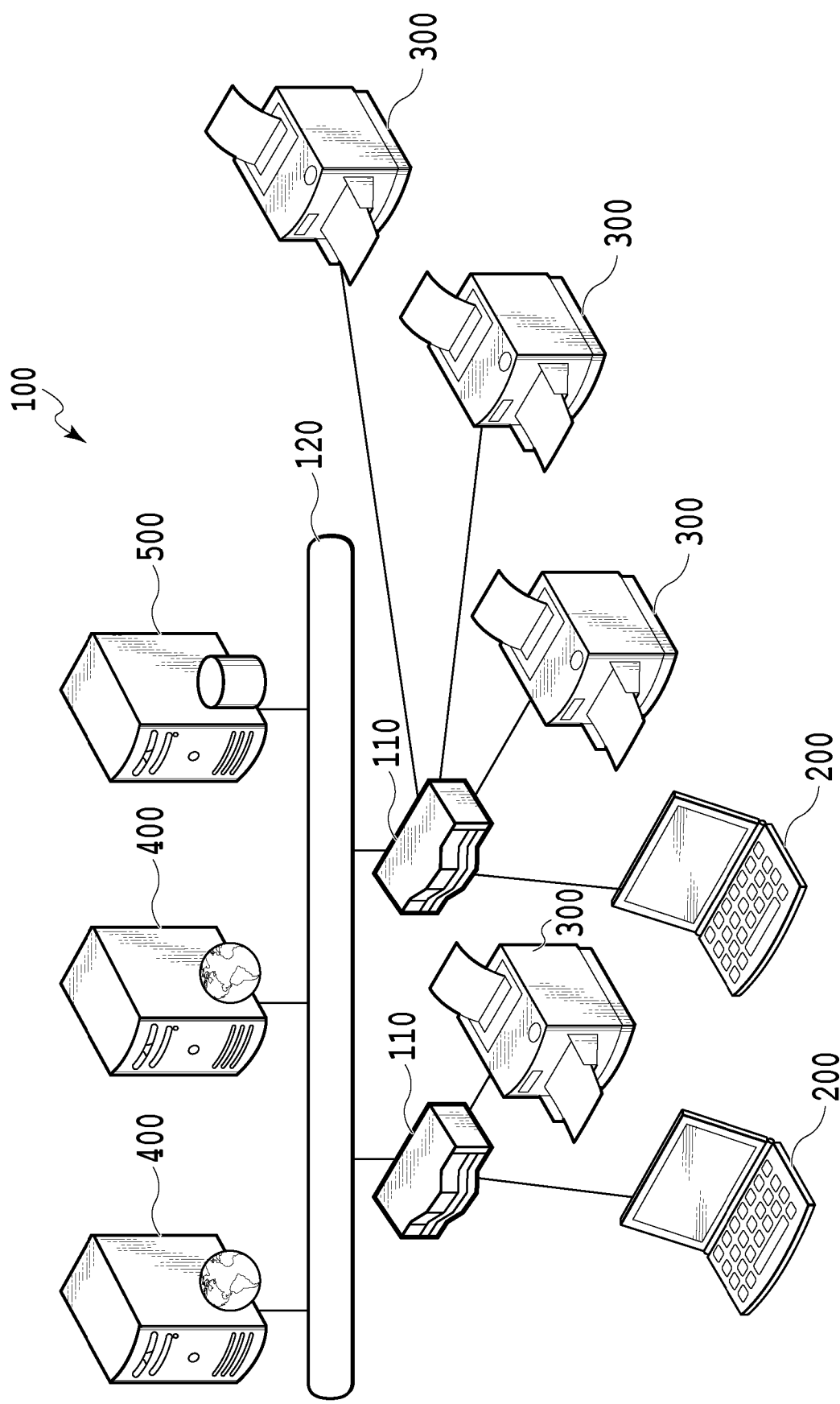
FIG. 1 is a diagram illustrating an exemplary entire configuration of an information processing system in embodiment 1.

FIG. 1 is a diagram illustrating an exemplarily entire configuration of an information processing system 100 in this embodiment. Hereinbelow, details of an exemplary system configuration of this embodiment will be described with reference to FIG. 1. In the information processing system 100, terminal apparatuses 200 being information processing apparatuses and multi-function printers (MFPs) 300 being image processing apparatuses are connected to a communication network 120 through routers 110. Service provision servers 400 and a management server 500 are connected to the communication network 120. The terminal apparatuses 200 and the MFPs 300 are configured to be communicable with each other through the routers 110 and are also configured to be communicable with the servers on the communication network 120. The management server 500 mainly manages printers ID of the MFPs 300 and provides later-described management information indicating whether or not a printer ID is valid in response to a request from a service provision server 400. In this embodiment, the communication network 120 is the Internet, and each service provision server 400 can provide a web service through this communication network 120.

Figure 2:
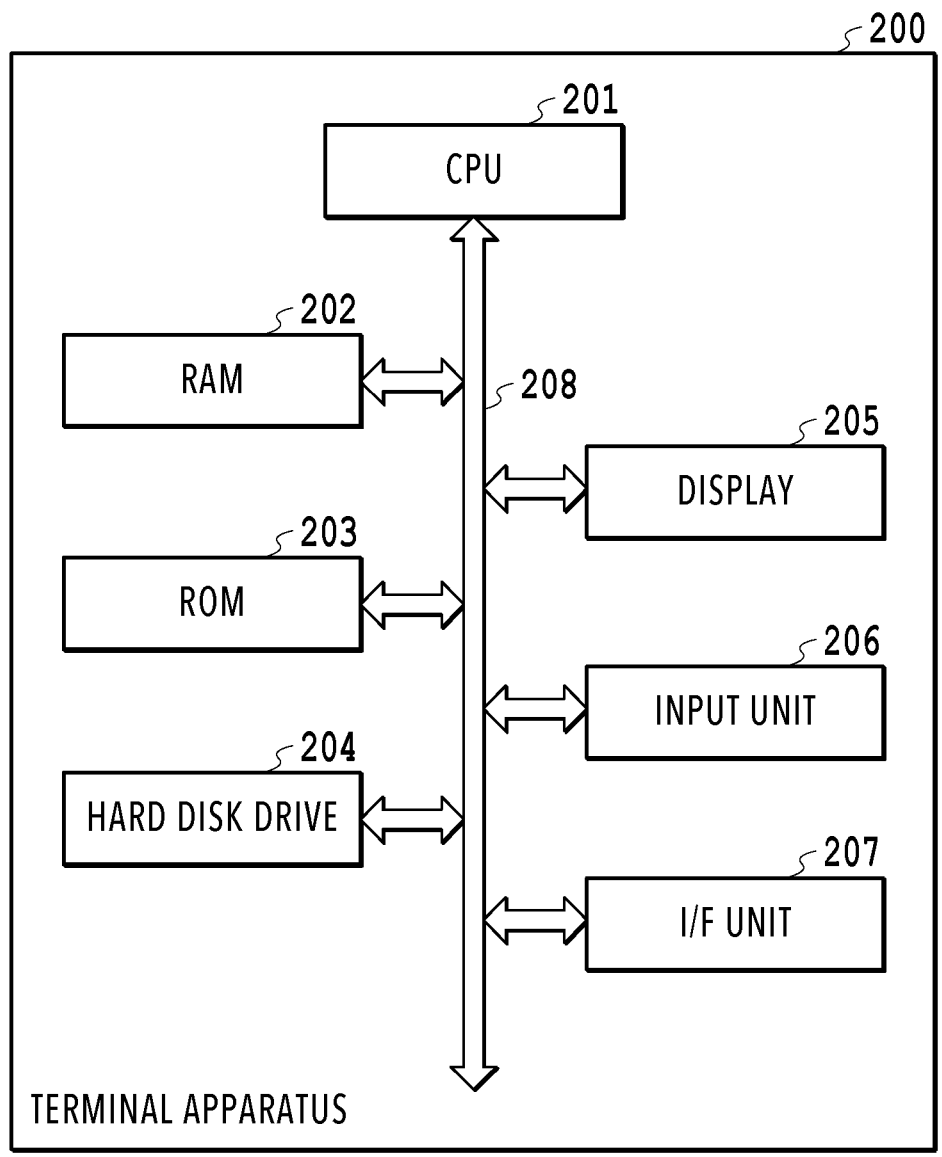
FIG. 2 is a block diagram illustrating an exemplary hardware configuration of each terminal apparatus in embodiment 1.

FIG. 2 is a block diagram illustrating an exemplary hardware configuration of each terminal apparatus 200 in this embodiment. As illustrated in FIG. 2, each terminal apparatus 200 in this embodiment is a computer including a CPU 201, an RAM 202, an ROM 203, and so on. Hereinbelow, an exemplary hardware configuration of each terminal apparatus 200 in this embodiment will be described with reference to FIG. 2. The CPU 201 performs computation and control in accordance with software stored in the RAM 202, the ROM 203, or a hard disk drive 204. The RAM 202 is used as a temporary storage area while the CPU 201 executes various processes. The hard disk drive 204 stores an operating system (OS), a later-described registration program, and so on. A display 205 includes a liquid crystal display and a graphic controller, and the display 205 displays objects such as images and icons as well as GUIs and so on. An input unit 206 is a device with which the user gives various instructions to the terminal apparatus 200 and is configured of a mouse and a keyboard, for example. An interface unit (I/F) unit 207 can control wireless LAN communication in conformity with a standard such as IEEE 802.11a and wired LAN communication, and communicates with external apparatuses through the same communication network and the Internet based on a protocol such as TCP/IP. A system bus 208 controls exchange of data between the CPU 201, the RAM 202, the ROM 203, the hard disk drive 204, and so on. Note that as illustrated in FIG. 2, the terminal apparatus 200 in this embodiment is exemplarily in the form of a so-called laptop PC configured of the CPU 201, the RAM 202, the display 205, the input unit 206, and so on within a single body. The form of the terminal apparatus 200 is not limited to a laptop PC but this terminal apparatus 200 may be a so-called desktop PC or a so-called tablet terminal.

Figure 3:
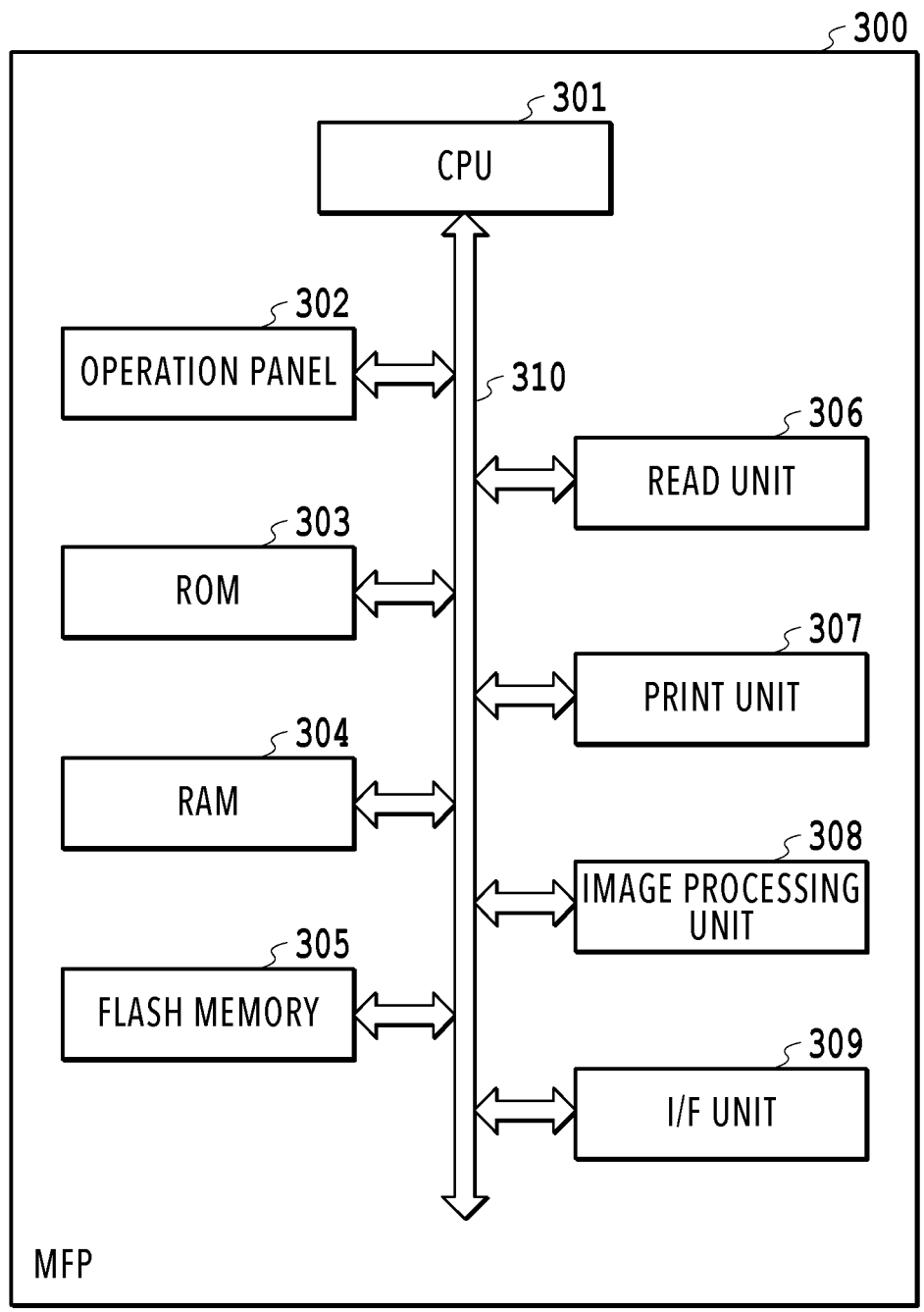
FIG. 3 is a block diagram illustrating an exemplary hardware configuration of each MFP in embodiment 1.

FIG. 3 is a block diagram illustrating an exemplary hardware configuration of each MFP 300 in this embodiment. Each MFP 300 in this embodiment has information processing functions such as the obtaining, storage, and notification of a printer ID and further has an image forming function of forming an image on a printing medium by means of a later-described print unit 307. In other words, the MFP 300 can be seen as an image forming apparatus. Hereinbelow, an exemplary hardware configuration of each MFP 300 in this embodiment will be described with reference to FIG. 3. Each MFP 300 includes a CPU 301, an operation panel 302, an ROM 303, an RAM 304, a flash memory 305, a read unit 306, the print unit 307, an image processing unit 308, an I/F unit 309, and a system bus 310. The CPU 301 controls operation of the MFP 300 by reading out a program stored in the ROM 303 into the RAM 304 and executing it in accordance with a user operation input and received through the operation panel 302. The ROM 303 stores control command programs and so on for the MFP 300. The RAM 304 is used as a temporary storage area while the CPU 301 executes various processes and used also as a storage area for spooling print jobs. The flash memory 305 is a non-volatile storage area and stores information obtained by the MFP 300. For example, a printer ID (identification information) issued by the management server 500 is stored in the flash memory 305. Thus, the printer ID can be kept stored even after the MFP 300 is powered off. The operation panel 302 is configured of a display that displays screens designed to be presented to the user. This display has a touchscreen function, and therefore a user instruction input and received through the display can be handled as an input to the operation panel 302 as well. The read unit 306 includes an optical sensor that reads a document and stores the image read by the optical sensor in the RAM 304. The print unit 307 includes ink tanks, a print head, a conveyance unit that conveys printing media, and so on and forms an image on a printing medium based on an inkjet method. Note that the print mechanism of the print unit is not limited to an inkjet mechanism but an electrophotographic print mechanism may be employed instead. The image processing unit 308 performs image processing on the image read by the read unit 306, the image processing being necessary for printing the image at the print unit 307. Since the image subjected to the image processing is printed at the print unit 307, the MFP 300 in this embodiment implements a photocopying function. The I/F unit 309 can control wireless LAN communication in conformity with a standard such as IEEE 802.11a and wired LAN communication, and communicates with external apparatuses through the same communication network and the Internet based on a protocol such as TCP/IP.

Figure 4:
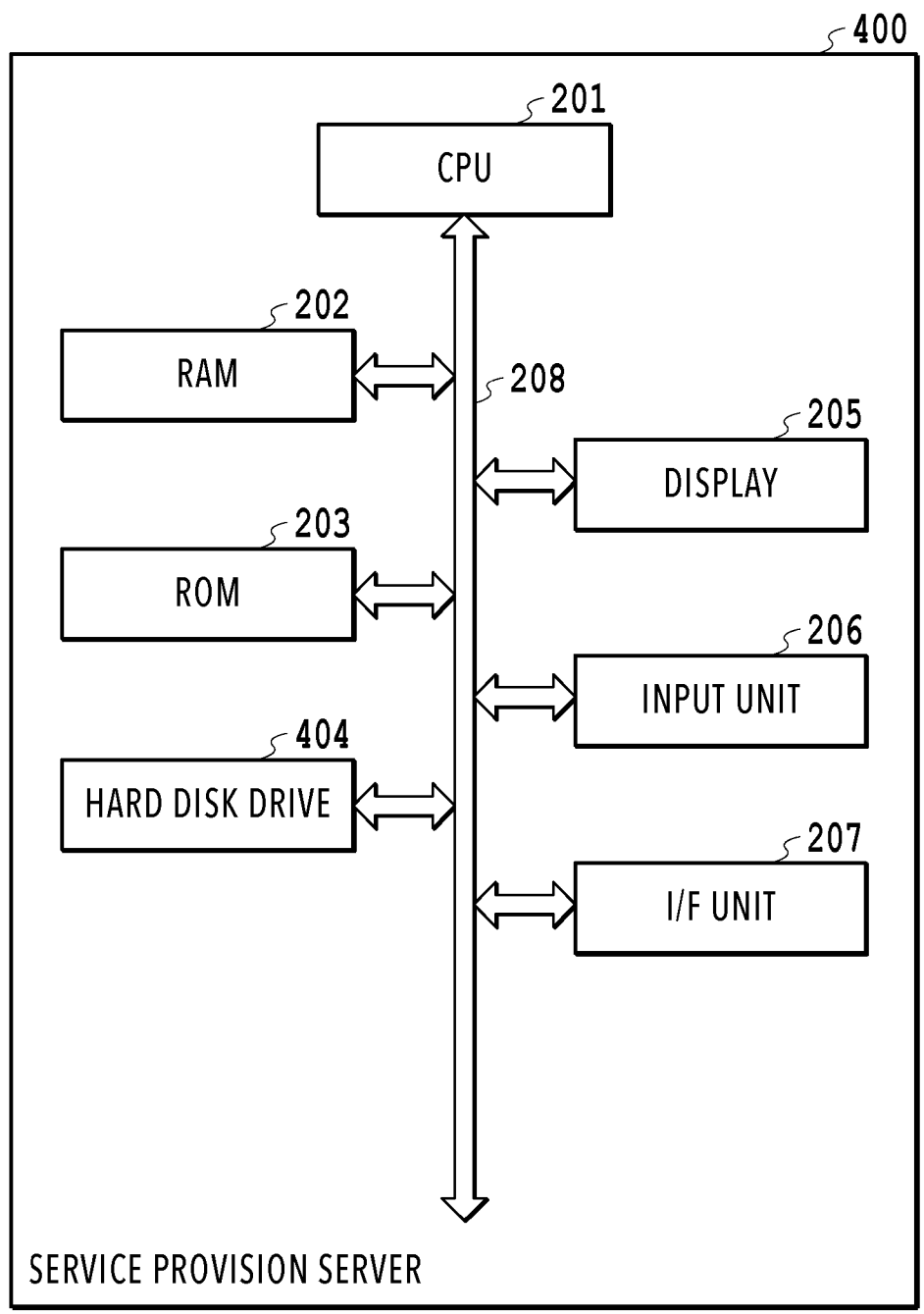
FIG. 4 is a block diagram illustrating an exemplary hardware configuration of each service provision server in embodiment 1.

FIG. 4 is a block diagram illustrating an exemplary hardware configuration of each service provision server 400 in this embodiment. Hereinbelow, an exemplary hardware configuration of each service provision server 400 in this embodiment will be described with reference to FIG. 4. Note that a typical computer can be employed as the service provision server 400, and the service provision server 400 will be described in this embodiment as including similar components to those of each terminal apparatus 200 described with reference to FIG. 2. Thus, the same components as those of the terminal apparatus 200 will be denoted by the same reference signs, and description thereof will be omitted. Software stored in a hard disk drive 404 of the service provision server 400 in this embodiment differs from that in the terminal apparatus 200. Specifically, the hard disk drive 404 stores a web page generation program that generates a registration page upon receipt of a printer ID from a terminal apparatus 200, and a printer ID validation program that requests validation of the printer ID. The hard disk drive 404 further stores a user information management database in which user information on each MFP 300 is managed, and a database management program. Details of the web page generation program, the printer ID validation program, the user information management database, and the database management program will be described later.

Figure 5:
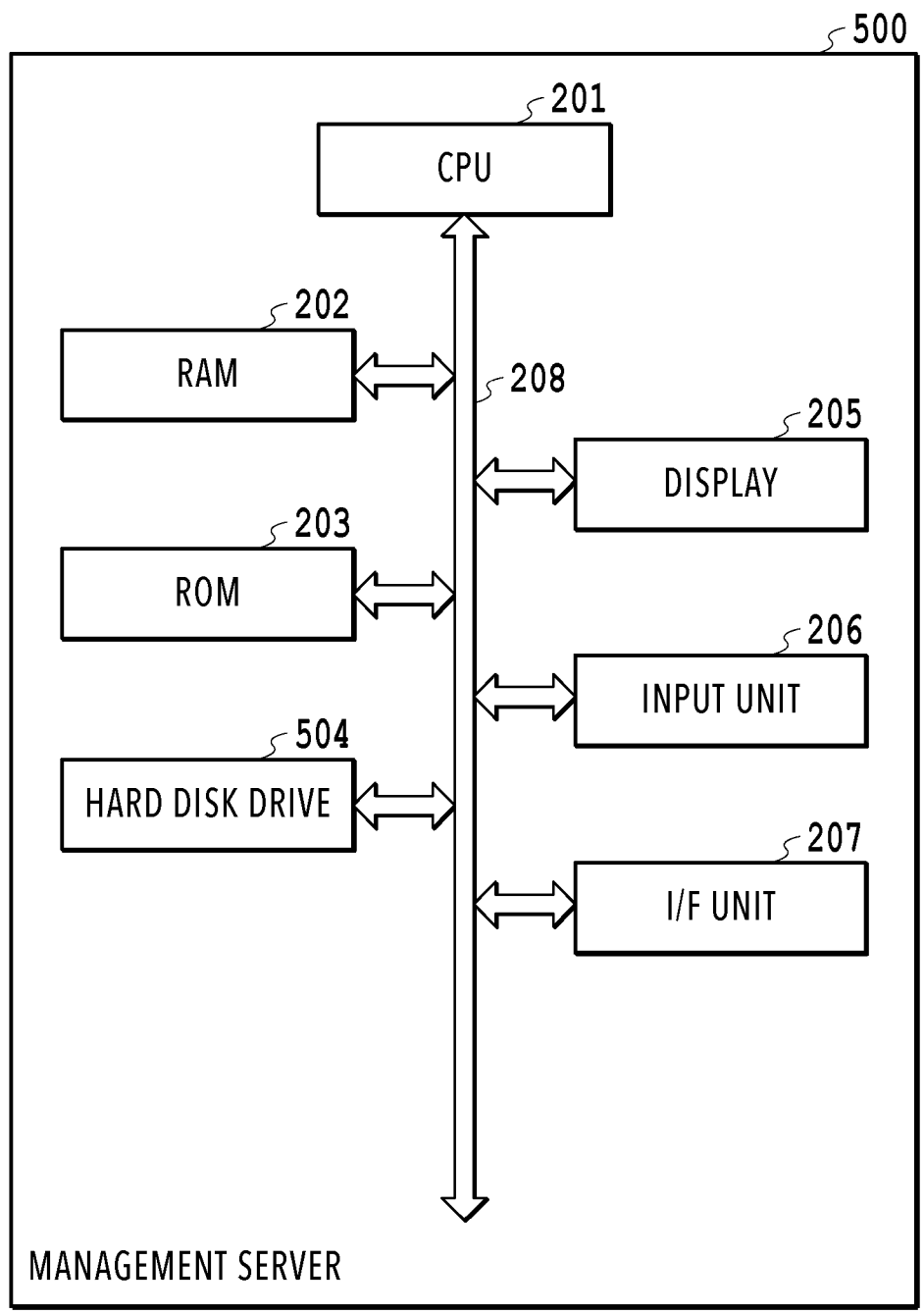
FIG. 5 is a block diagram illustrating an exemplary hardware configuration of a management server in embodiment 1.

FIG. 5 is a block diagram illustrating an exemplary hardware configuration of the management server 500 in this embodiment. Hereinbelow, an exemplary hardware configuration of the management server 500 in this embodiment will be described with reference to FIG. 5. Note that a typical computer can be employed as the management server 500, and the management server 500 will be described in this embodiment as including similar components to those of each terminal apparatus 200 described with reference to FIG. 2. Thus, the same components as those of the terminal apparatus 200 will be denoted by the same reference signs, and description thereof will be omitted. Software stored in a hard disk drive 504 of the management server 500 in this embodiment differs from that in the terminal apparatus 200. Specifically, the hard disk drive 504 stores a printer ID issuance program that issues a printer ID upon receipt of a printer ID issuance request from an MFP 300, and a printer ID management database in which the issued printer ID is stored in association with its issuance time and date and status. The hard disk drive 504 further stores a printer ID validation program that performs a printer ID validation process upon receipt of a printer ID validation request from a service provision server 400. Details of the printer ID issuance program, the printer ID management database, and the printer ID validation program will be described later.

Figure 6:
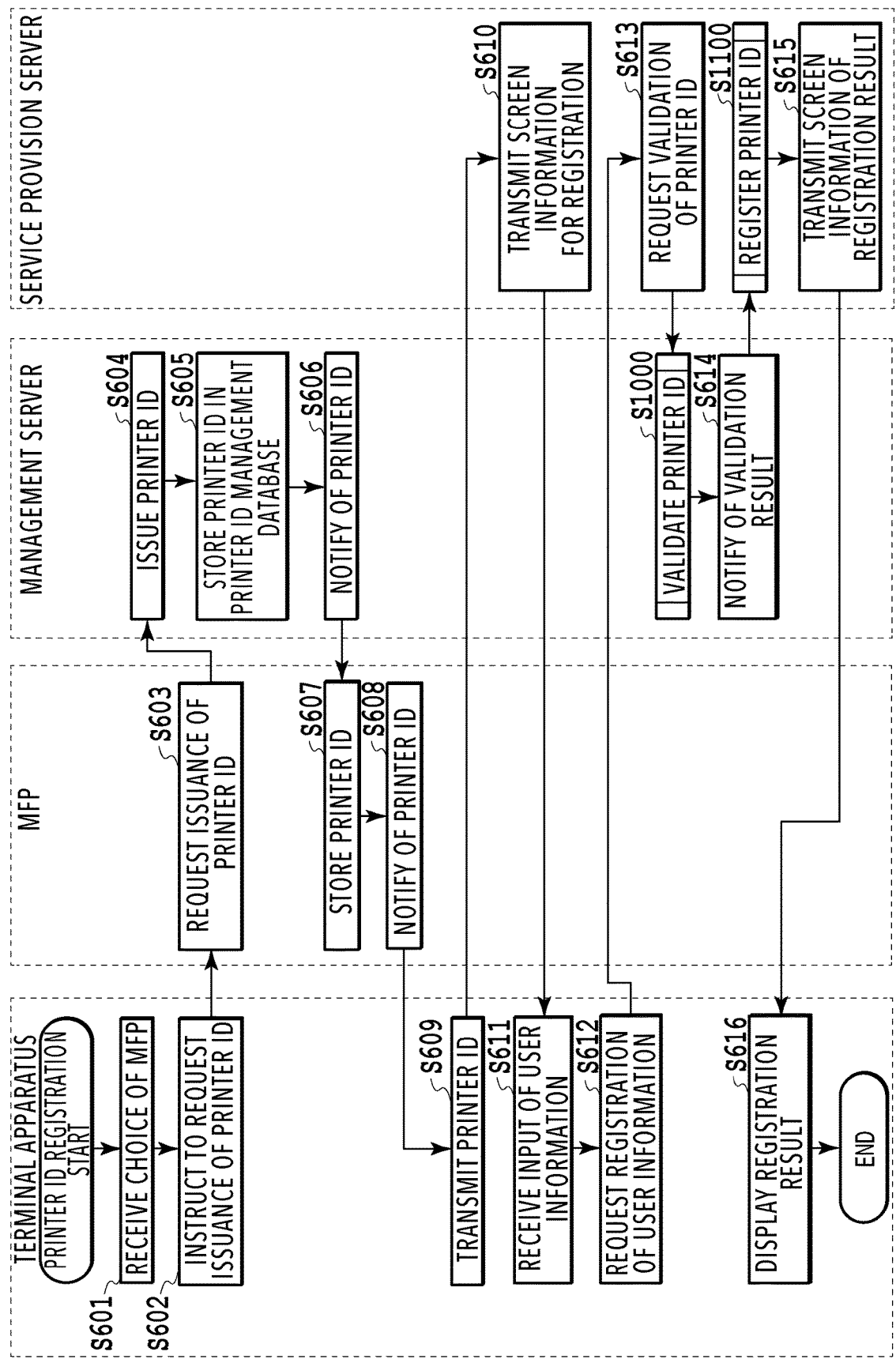
FIG. 6 is a sequence chart illustrating a procedure of registering a printer ID in embodiment 1.

FIG. 6 is a sequence chart illustrating a procedure of registering a printer ID in this embodiment. Hereinbelow, an exemplary procedure of registering a printer ID will be described with reference to the sequence chart in FIG. 6. The CPUs decompress program codes stored in the respective storage areas into the respective RAMs and execute them to perform the process of the sequence chart illustrated in FIG. 6. Each reference sign S in the following means a step in the sequence chart or flowchart. This applies also to the charts following FIG. 6.

In S601, from the user, a terminal apparatus 200 receives his or her choice about for which MFP 300 to obtain a printer ID. Here, an example of receiving the choice about the MFP 300 from the user will be described with reference to FIG. 7. FIG. 7 is a schematic diagram of a graphical user interface (GUI) displayed on the display 205 by the registration program of the terminal apparatus 200. In a case where the registration program of the terminal apparatus 200 is started, it displays the GUI illustrated in FIG. 7 on the display 205, searches for the MFPs connected to the communication network 120, and displays a list of the found MFPs within a list display area 701. In this embodiment, as illustrated in the GUI in FIG. 7, two MFPs with a printer name "Model 100" and one MFP with a printer name "Model 700" are found. Note that the UI in this embodiment displays printer names and IP addresses together so that even if a plurality of MFPs of the same model are found, one of them can be registered or chosen. In a case where the user chooses the printer name representing the MFP for which to obtain a printer ID and pushes a registration button 702, the registration program of the terminal apparatus 200 issues an instruction to request the management server 500 to issue the printer ID. Note that the printer ID of the MFP 300 is identification information used to uniquely identify the MFP 300 and is also used as authentication information used to authenticate the MFP 300 after the printer ID is registered in the service provision server 400.

In S602, the terminal apparatus 200 instructs the MFP 300 to request the management server 500 to issue the printer ID.

In S603, upon receipt of the instruction from the terminal apparatus 200, the MFP 300 requests the management server 500 to issue the printer ID.

In S604, the management server 500 issues the printer ID of the MFP 300 upon receipt of the printer ID issuance request from the MFP 300.

In S605, the management server 500 stores the printer ID issued in S604 in the printer ID management database.

In S606, the management server 500 notifies the MFP 300 of the printer ID issued in S604.

FIG. 8A is a schematic diagram illustrating exemplary contents of the printer ID management database in this embodiment. This printer ID management database is stored in the hard disk drive 504 of the management server 500, as mentioned above. In response to the issuance of the printer ID in S604, the printer ID issuance program stores the issued printer ID, the issuance time and date on which the printer ID was issued, and the status of the printer ID in the printer ID management database. In this embodiment, the status of the printer ID is information indicating a status about whether or not the printer ID issued by the management server 500 is registered in the service provision server 400. This status of the printer ID is stored as a status of either "registered" or "unregistered." At S605, the printer ID is not yet registered in the service provision server 400. Accordingly, FIG. 8A illustrates an example in which issuance time and date "2017/06/30 12:34:56" and the status "unregistered" are stored in association with a printer ID "00001" in the printer ID management database. Meanwhile, printer IDs are issued as sequential numbers starting from "00001" in this embodiment.

Referring back to the sequence chart in FIG. 6, in S607, upon notification of the printer ID from the management server 500, the MFP 300 stores the printer ID notified of in the flash memory 305.

In S608, the MFP 300 notifies the terminal apparatus 200 of the printer ID received in S607. This process by the registration program receiving the printer ID from the MFP 300 in response to an instruction to request issuance of the printer ID by the registration program (S602) corresponds to an identification information obtaining unit.

In S609, the terminal apparatus 200 transmits the printer ID received in S608 to the service provision server 400. This process by the registration program transmitting the printer ID to the service provision server 400 (S609) corresponds to an identification information transmission unit.

In S610, upon receipt of the printer ID from the terminal apparatus 200, the web page generation program of the service provision server 400 generates screen information representing a screen for registering user information and transmits the generated screen information to the terminal apparatus 200. This process by the service provision server 400 receiving the printer ID from the terminal apparatus 200 corresponds to an identification information reception unit.

In this embodiment, the web page generation program generates a web page for registering the user information and transmits a URL for accessing that registration web page to the terminal apparatus 200. Here, the user information in this embodiment is user information on the MFP 300, and this user information is necessary information for using the web service provided by the service provision server 400. This process by the service provision server 400 transmitting the screen information representing the screen for registering the user information to the terminal apparatus 200 (S610) corresponds to a request transmission unit configured to transmit a user information transmission request to the terminal apparatus 200.

In S611, after the registration web page received from the service provision server 400 is displayed on a browser of the terminal apparatus 200, the terminal apparatus 200 receives an input of the user information from the user. This process by the terminal apparatus 200 receiving the screen information representing the registration screen from the service provision server 400 (S611) corresponds to a request reception unit configured to receive a request to transmit user information as a response to the transmission of the printer ID (S609).

In S612, the registration program of the terminal apparatus 200 requests the service provision server 400 to register the user information input and received in S611.

Figure 9:
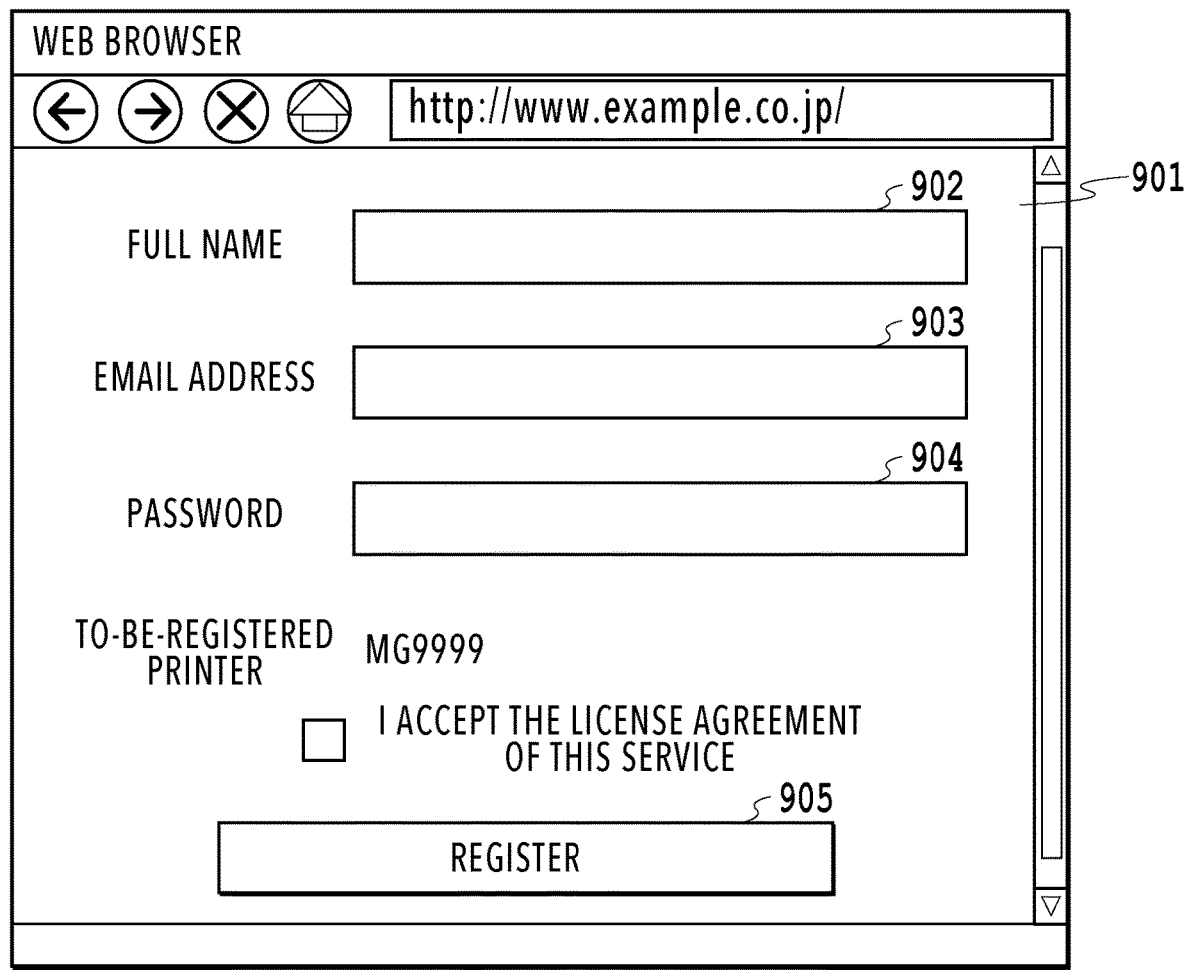
FIG. 9 is a diagram illustrating an exemplary GUI for registration in embodiment 1.

FIG. 9 is a diagram illustrating an exemplary GUI displayed based on the screen information representing the registration screen in this embodiment. A registration page 901 displayed on the web browser of the terminal apparatus 200 includes a full name input form 902, an email address input form 903, and a password input form 904. Further, a to-be-registered printer display area, a license agreement checkbox, and a register button 905 are displayed on the registration page 901. In a case where the user inputs his or her full name, email address, and password into the respective input forms, checks the license agreement checkbox, and then presses the register button 905, the service provision server 400 is requested to register the user information (S612). This process by the registration program transmitting the input and received user information to the service provision server 400 (S612) corresponds to a user information transmission unit.

Referring back to the sequence chart in FIG. 6, in S613, upon receipt of the user information from the terminal apparatus 200, the service provision server 400 requests the management server 500 to validate the received printer ID. This process by the service provision server 400 receiving the user information from the terminal apparatus 200 corresponds to a user information reception unit.

Figure 10:
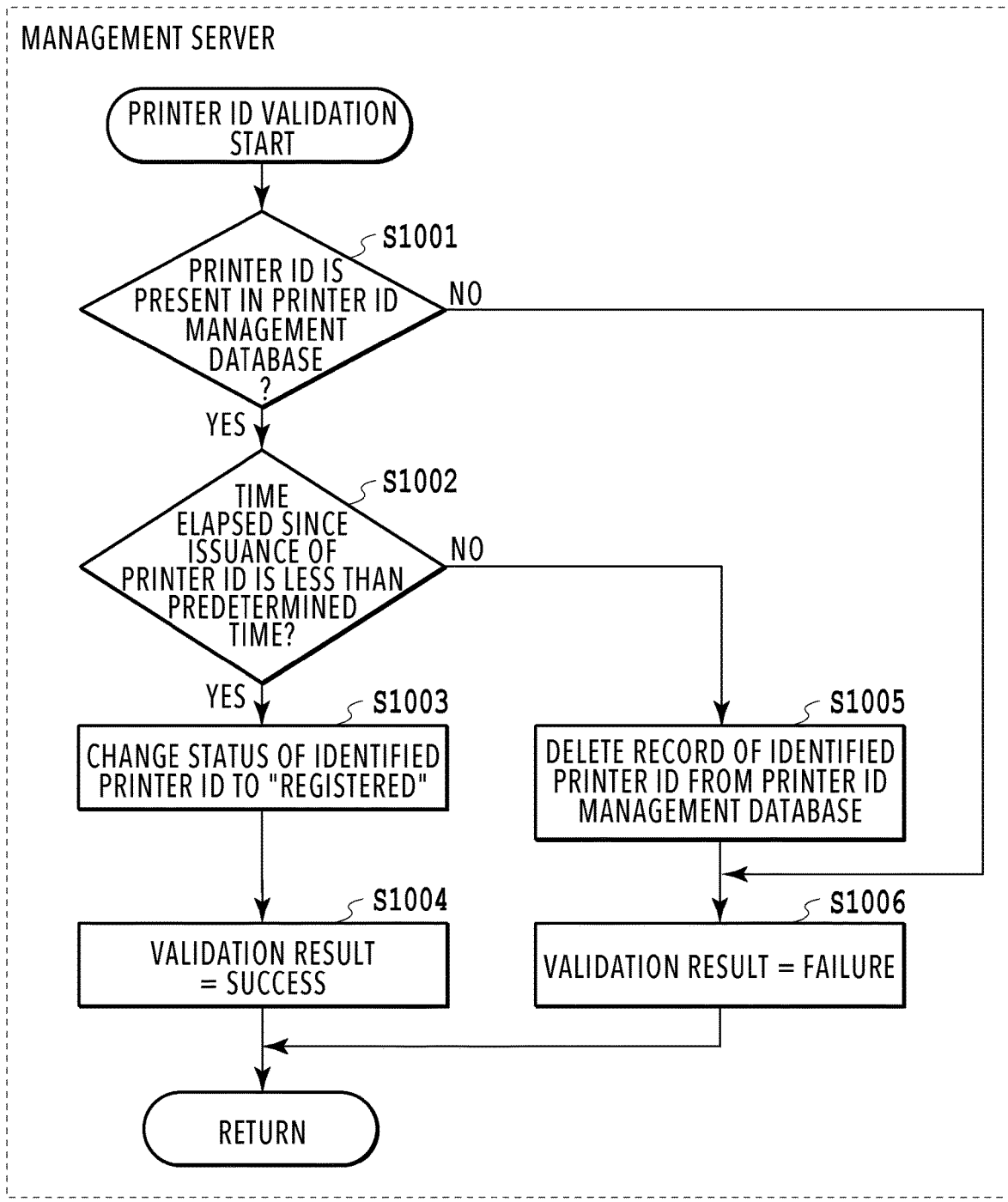
FIG. 10 is a flowchart illustrating an exemplary procedure of validating a printer ID in embodiment 1.

In S1000, upon receipt of the printer ID validation request from the service provision server 400, the management server 500 executes the printer ID validation process. FIG. 10 is a flowchart illustrating a procedure of validating a printer ID in this embodiment. Hereinbelow, an exemplary procedure of validating a printer ID will be described with reference to the flowchart in FIG. 10.

In S1001, the printer ID validation program of the management server 500 determines whether or not the printer ID is stored in the printer ID management database. In a case where the printer ID is stored (S1001: YES), the printer ID validation program proceeds to a determination process in the S1002. In a case where the printer ID is not stored (S1001: NO), the printer ID validation program proceeds to S1006.

In S1002, the printer ID validation program determines whether or not the time elapsed since the issuance of the printer ID is less than a predetermined time. Specifically, the printer ID validation program determines whether or not the printer ID is valid based on whether or not the difference between the issuance time at which the printer ID was issued and the current time is shorter than the predetermined time. In a case where the printer ID is valid (S1002: YES), the printer ID validation program accesses the printer ID management database (FIG. 8A) in S1003. Then, the printer ID validation program changes the status associated with the printer ID identified in the validation request from "unregistered" to "registered." On the other hand, in a case where the printer ID is invalid (S1002: NO), the printer ID validation program proceeds to S1005.

In S1004, the printer ID validation program sets a validation result to "success." After S1004 is completed, the process of this flowchart is terminated, and the processing returns to the process of the sequence chart in FIG. 6. Note that the above validation result is a variable used in the printer ID validation program.

On the other hand, in a case where the printer ID is invalid (S1002: NO), the printer ID validation program deletes the record of the printer ID identified in the validation request from the printer ID management database in S1005. Note that in this embodiment, a printer ID that has been present for the predetermined time since its issuance is deleted in S1005. However, the management server 500 may automatically delete a printer ID that has been present for the predetermined period since its issuance. In this case, S1005 in the flowchart of FIG. 10 is skipped.

After S1005 or in a case where the printer ID is not stored in the printer ID management database (S1001: NO), the printer ID validation program sets the validation result to "failure" in S1006. After S1006 is completed, the process of this flowchart is terminated, and the processing returns to the process of the sequence chart in FIG. 6.

Referring back to the sequence chart in FIG. 6, in S614, the management server 500 notifies the service provision server 400 of the validation result set in S1000.

Figure 11:
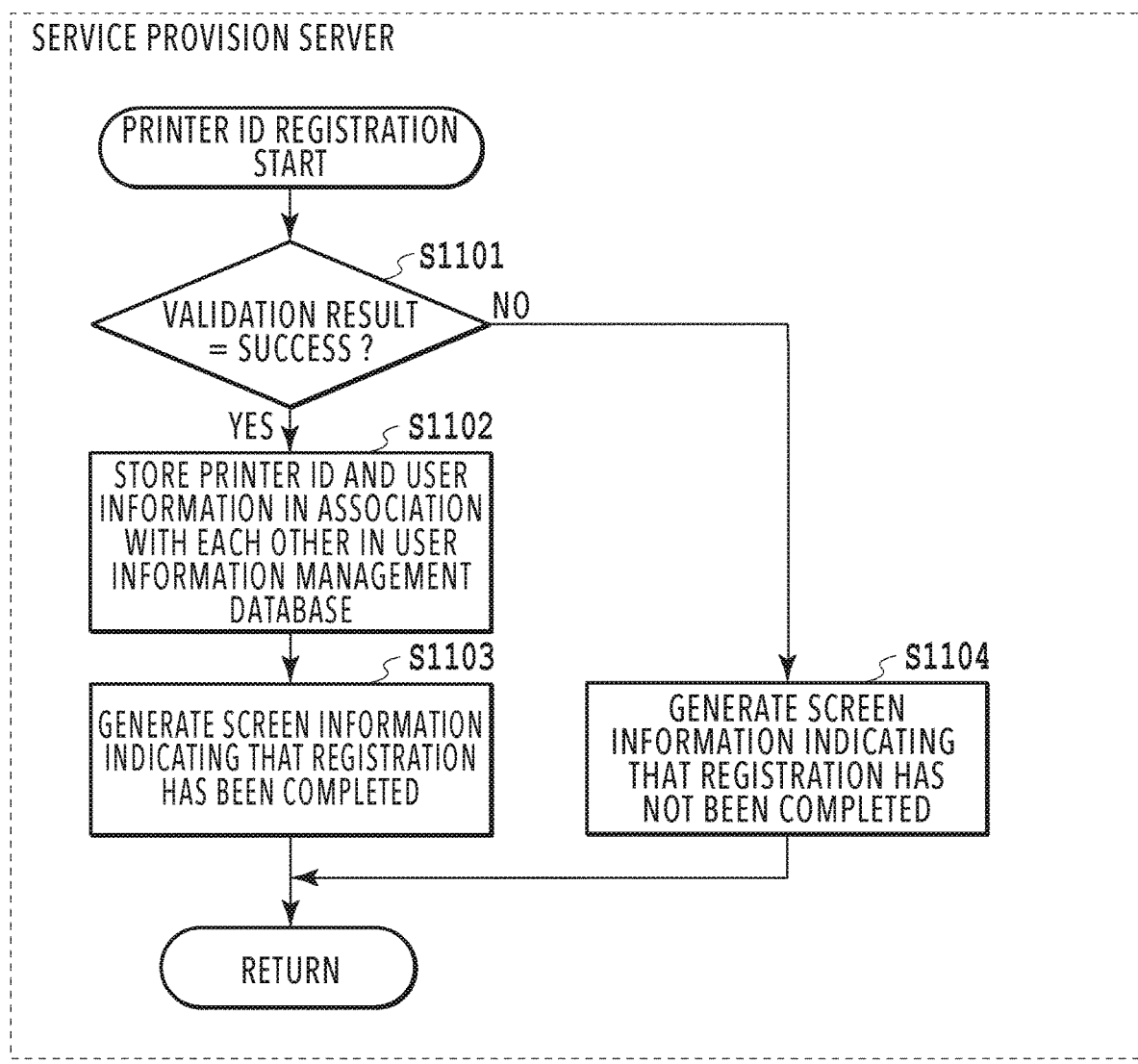
FIG. 11 is a flowchart illustrating a procedure of registering a printer ID in embodiment 1.

In S1100, the service provision server 400 executes a printer ID registration process upon receipt of the validation result of the printer ID from the management server 500. FIG. 11 is a flowchart illustrating a procedure of registering a printer ID in this embodiment. Hereinbelow, an exemplary procedure of registering a printer ID will be described with reference to the flowchart in FIG. 11.

In S1101, the database management program of the service provision server 400 determines whether or not the printer ID has been validated by the management server 500. Specifically, the database management program determines whether or not the validation result received from the management server 500 indicates "success." In a case where the printer ID has been validated (S1101: YES), the database management program proceeds to S1102. In a case where the printer ID has not been validated (S1101: NO), the database management program proceeds to S1104.

In S1102, the database management program of the service provision server 400 registers the printer ID and the user information in association with each other in the user information management database. FIG. 8B is a schematic diagram illustrating exemplary contents of the user information management database in this embodiment. The user information management database in FIG. 8B illustrates a state after registration of an email address "user[0056] example.com," a password "abcd1234," and the printer ID "00001." In this embodiment, the screen information representing the registration screen associated with the printer ID is generated in S610. For this reason, the service provision server 400 can identify which printer ID is associated with the user information transmitted from the terminal apparatus 200 in S1102.

In S1103, the service provision server 400 generates screen information indicating that the registration has been completed. After S1103 is completed, the process of this flowchart is terminated, and the processing returns to the process of the sequence chart in FIG. 6. On the other hand, in a case where the printer ID has not been validated (S1101: NO), the service provision server 400 generates screen information indicating that the registration has not been completed in S1104. After S1104 is completed, the process of this flowchart is terminated, and the processing returns to the process of the sequence chart in FIG. 6.

Referring back to the sequence chart in FIG. 6, in S615, the service provision server 400 transmits screen information for displaying the registration result generated in S1100 to the terminal apparatus 200.

In S616, based on the screen information received from the service provision server 400, the terminal apparatus 200 displays a GUI indicating the registration result on the web browser of the terminal apparatus 200. In this step, in a case where the printer ID have failed to be registered in the user information management database, the failure to register the printer ID and its reason may be displayed together. After S616 is completed, the process of this sequence chart is terminated.

As described above, a printer ID is not only used as identification information for uniquely identifying an MFP 300 but also used as authentication information for authenticating the MFP 300. In this embodiment, in the case where an MFP 300 uses the web service provided by a service provision server 400, the MFP 300 transmits its printer ID stored in itself to the service provision server 400 prior to using the web service. In the service provision server 400, printer IDs and pieces of user information are stored in association with each other in the user information management database. Thus, based on the printer ID received from the MFP 300, the database management program of the service provision server 400 can read out the associated user information. The service provision server 400 performs user authentication for the web service by using the user information thus read out (e.g. email address and password), and starts providing the web service to the MFP 300 in a case where the authentication succeeds. Alternatively, in the case where a printer ID and user information associated with it are registered in the user information management database of the service provision server 400, access permission information necessary for authentication for the web service (such as an access token) may be generated based on these pieces of information. By transmitting the generated access permission information to the MFP 300, the MFP 300 can use the web service.

In this embodiment, registration of user information is requested (S612) by receiving inputs of at least the full name, an email address, and a password through the registration page 901 (FIG. 9). However, a provisional registration method may be used. Specifically, only the email address may be provisionally registered first, and a registration page for registering other information than the email address may be transmitted to the provisionally registered email address.

In this embodiment, the procedure of registering the printer ID of an MFP 300 in a single service provision server 400 has been described with reference to the sequence chart in FIG. 6. In other embodiments, the number of servers is not limited to one, and the printer ID of an MFP 300 may be registered in a plurality of service provision servers 400 that provide a plurality of types of web services.

As described above, according to the printer ID registration technique in this embodiment, a printer ID issued by the management server is used, and the printer ID and user information are registered in association with each other in a service provision server that provides a web service. Thus, according to this embodiment, it is possible to easily register an apparatus to which to provide a web service with no complicated procedure required such as inputting a provisional registration ID obtained with a terminal apparatus into an MFP or referring to printed information and inputting a code into a terminal apparatus.

Embodiment 2

Figure 12:
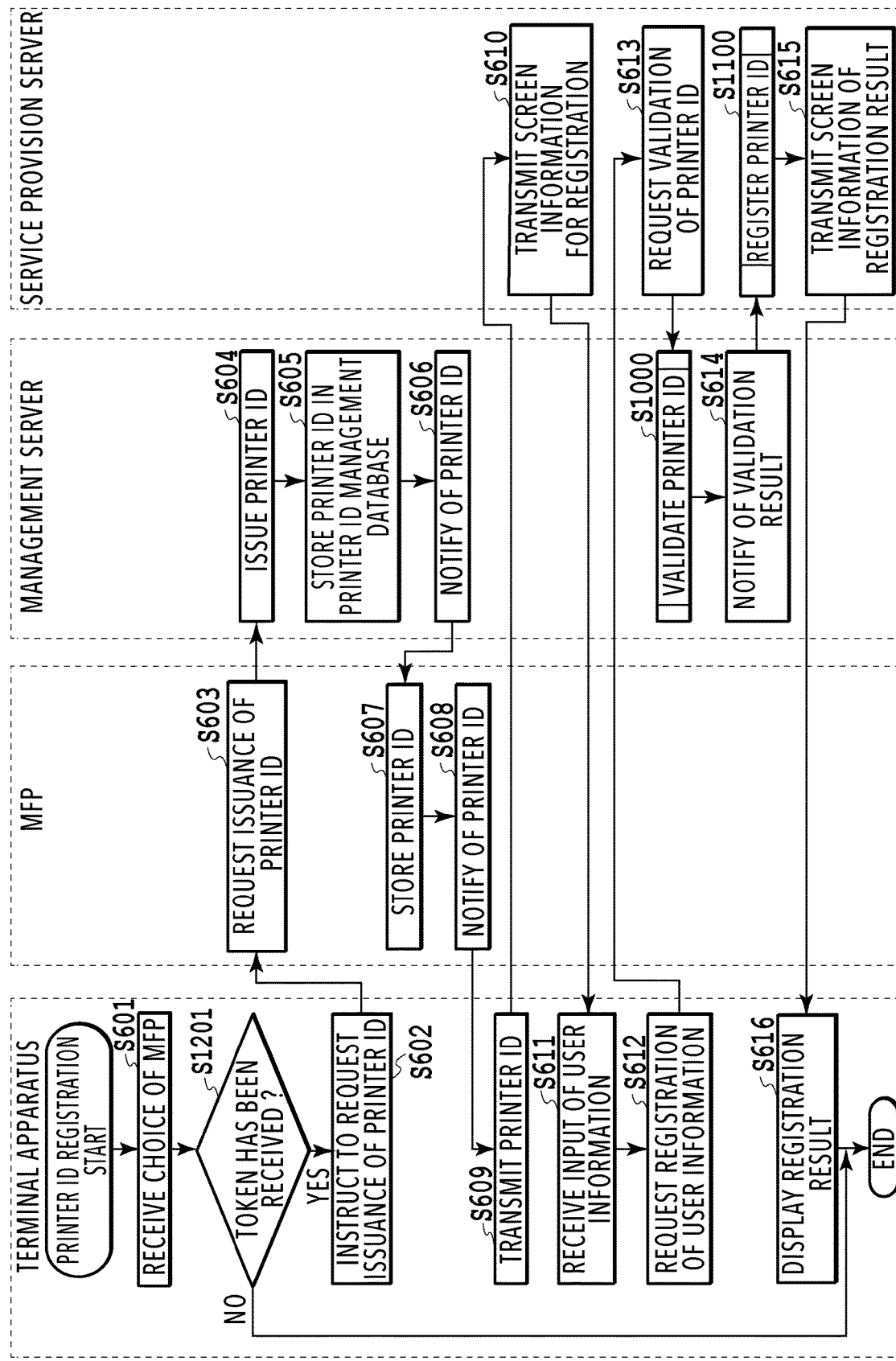
FIG. 12 is a sequence chart illustrating a procedure of registering a printer ID in embodiment 2.

A second embodiment of the present invention will be described with reference to FIG. 12. FIG. 12 is a sequence chart illustrating a procedure of registering a printer ID in this embodiment. Note that description of the same parts as those in the sequence chart in embodiment 1 will be simplified or omitted, and features unique to this embodiment will be mainly described below.

In the procedure of registering a printer ID in this embodiment, a terminal apparatus 200 performs a process of obtaining access permission information from the management server 500 in S1201 before instructing an MFP 300 to request issuance of a printer ID (S602). In the token obtaining process in S1201, the terminal apparatus 200 attempts to obtain an access URL for the MFP 300 to access the management server 500, an access token, and a refresh token. In a case where obtaining these pieces of information (S1201: YES), the terminal apparatus 200 proceeds to S602. This process by the registration program obtaining access permission information corresponds to a permission information obtaining unit. On the other hand, in a case where obtaining no token due to a reason such as that the management server 500 is under maintenance (S1201: NO), the processes in S602 and the subsequent steps are skipped, and the process of this sequence chart is terminated.

In S602, the terminal apparatus 200 instructs the MFP 300 to request the management server 500 to issue the printer ID. In doing so, the terminal apparatus 200 transmits the access URL, the access token, and the refresh token obtained in S1201 along with the printer ID issuance request or transmits the printer ID issuance request to the MFP 300 after incorporating the access URL, the access token, and the refresh token into the printer ID issuance request. In S603, the MFP 300 uses these pieces of information to request the management server 500 to issue the printer ID.

As described above, according to the printer ID registration technique in this embodiment, a terminal apparatus 200 transmits a token issued by the management server 500 to an MFP 300 along with an instruction to request issuance of a printer ID. Then, the MFP 300 uses this token to request the management server 500 to issue the printer ID. This allows more secure communication between the MFP 300 and the management server 500. Meanwhile, the MFP 300 is notified in advance of the URL of the management server 500, which the MFP 300 is to request to issue the printer ID. Thus, in a case where the management server 500 cannot issue the printer ID due to a reason such as being under maintenance, the MFP 300 can request an alternative management server to issue the printer ID.

Embodiment 3

A third embodiment of the present invention will be described with reference to FIG. 13. FIG. 13 is a diagram illustrating exemplary contents of the printer ID management database. A table 1301 in FIG. 13 is a table of the printer ID management database and schematically illustrates a state where the validation of the printer ID "00001" described in embodiment 1 has been completed. A printer ID "00002" will be issued in a case where the printer ID registration process in FIG. 6 is performed again in the state where the validation of the printer ID "00001" has been completed (i.e. a state where the registration of the printer ID "00001" has been completed). As a result, the contents of the printer ID management database will change from the state illustrated in the table 1301 to the state illustrated in a table 1302. In other words, the database management program of the management server 500 stores the issuance time and date and status of the printer ID "00002" in a record other than the record of the printer ID "00001" (S605). Then, the management server 500 notifies the MFP 300 of the printer IDs "00001" and "00002" (S606).

After obtaining these two printer IDs from the MFP 300 (S608), the terminal apparatus 200 transmits these two printer IDs to the service provision server 400 (S609) and proceeds with the printer ID registration process as in embodiment 1. The service provision server 400 transmits the old printer ID "00001" and the new printer ID "00002" received from the terminal apparatus 200 to the management server 500 to request the management server 500 to perform printer ID validation (S613).

In the printer ID validation (S1000), the printer ID validation program of the management server 500 validates the new printer ID "00002," and deletes the record of the issued old printer ID "00001" in a case where the validation succeeds. In a case where the record of the old printer ID "00001" is deleted, the contents of the printer ID management database will change from the state illustrated in the table 1302 to the state illustrated in a table 1303. Meanwhile, in this embodiment, each MFP 300 can check with the management server 500 about which printer IDs are stored in the printer ID management database. As a result of this check, the MFP 300 can delete any printer IDs deleted from the printer ID management database from its flash memory 305.

As described above, according to the printer ID registration technique in this embodiment, in a case where the second or subsequent issuance process is performed in a state where an old printer ID has been validated, the old printer ID is deleted from the printer ID management database after the new printer ID is validated. Then, in the process of registering the new printer ID, registration of user information to be associated with the new printer ID can be requested (S612). With such a configuration, in a case where the MFP 300 is given to a different user or other similar cases, different printer IDs can be registered for the previous and new users of the MFP 300. As a result, it is possible to avoid a situation where, in a case where an MFP 300 attempts to use a web service, the user information associated with its old printer ID is referred to, thereby making it impossible to pass the authentication for using the web service.

Embodiment 4

A fourth embodiment of the present invention will be described with reference to FIG. 14. FIG. 14 is a diagram illustrating exemplary contents of the printer ID management database. A table 1401 in FIG. 14 is a table of the printer ID management database and schematically illustrates a state immediately after storing the printer ID "00001" described in embodiment 1 (S605). Then, in S611, after the registration web page received from the service provision server 400 is displayed on the browser of the terminal apparatus 200, the terminal apparatus 200 receives an input of user information from the user. Here, in a case where the browser is closed without the register button 905 (FIG. 9) pressed, the printer ID registration process is terminated without performing the following printer ID validation. In a case where the second or subsequent printer ID registration process is performed without the printer ID validated, the management server 500 issues a new printer ID. As a result, the contents of the printer ID management database change from the state illustrated in the table 1401 to the state illustrated in a table 1402. In other words, the database management program of the management server 500 stores the issuance time and date and status of a printer ID "00003" in a record other than the record of the printer ID "00001" (S605). Then, the management server 500 notifies the MFP 300 of the printer IDs "00001" and "00003" (S606).

After obtaining these two printer IDs from the MFP 300 (S608), the terminal apparatus 200 transmits these two printer IDs to the service provision server 400 (S609) and proceeds with the printer ID registration process as in embodiment 1. The service provision server 400 transmits the old printer ID "00001" and the new printer ID "00003" received from the terminal apparatus 200 to the management server 500 to request the management server 500 to perform printer ID validation (S613).

In the printer ID validation (S1000), the printer ID validation program of the management server 500 validates the new printer ID "00003," and deletes the record of the old printer ID "00001" in a case where the validation succeeds. In a case where the record of the old printer ID "00001" is deleted, the contents of the printer ID management database will change from the state illustrated in the table 1402 to the state illustrated in a table 1403. Meanwhile, as in embodiment 3, each MFP 300 can check with the management server 500 about which printer IDs are stored in the printer ID management database. As a result of this check, the MFP 300 can delete any printer IDs deleted from the printer ID management database from its flash memory 305.

As described above, according to the printer ID registration technique in this embodiment, even if the printer ID issuance process is terminated in the middle, the old printer ID will be deleted from the printer ID management database in the subsequent process of issuing a new printer ID. Thus, with the printer ID registration technique in this embodiment, a printer ID of an MFP 300 can be reliably registered.

Embodiment 5

A fifth embodiment of the present invention will be described with reference to FIG. 15. The web page generation program of each service provision server 400 in this embodiment has a function of generating a resignation page. Then, based on user information registered through the resignation page, the printer ID validation program requests the management server 500 to delete the associated printer ID. After completing registration of a printer ID, the service provision server 400 in this embodiment transmits a registration completion notification email message to the registered email address. A URL for accessing the resignation page is described in this registration completion notification email message. The user can access the resignation page illustrated in FIG. 15 through the URL described in the registration completion notification email message.

Figure 15:
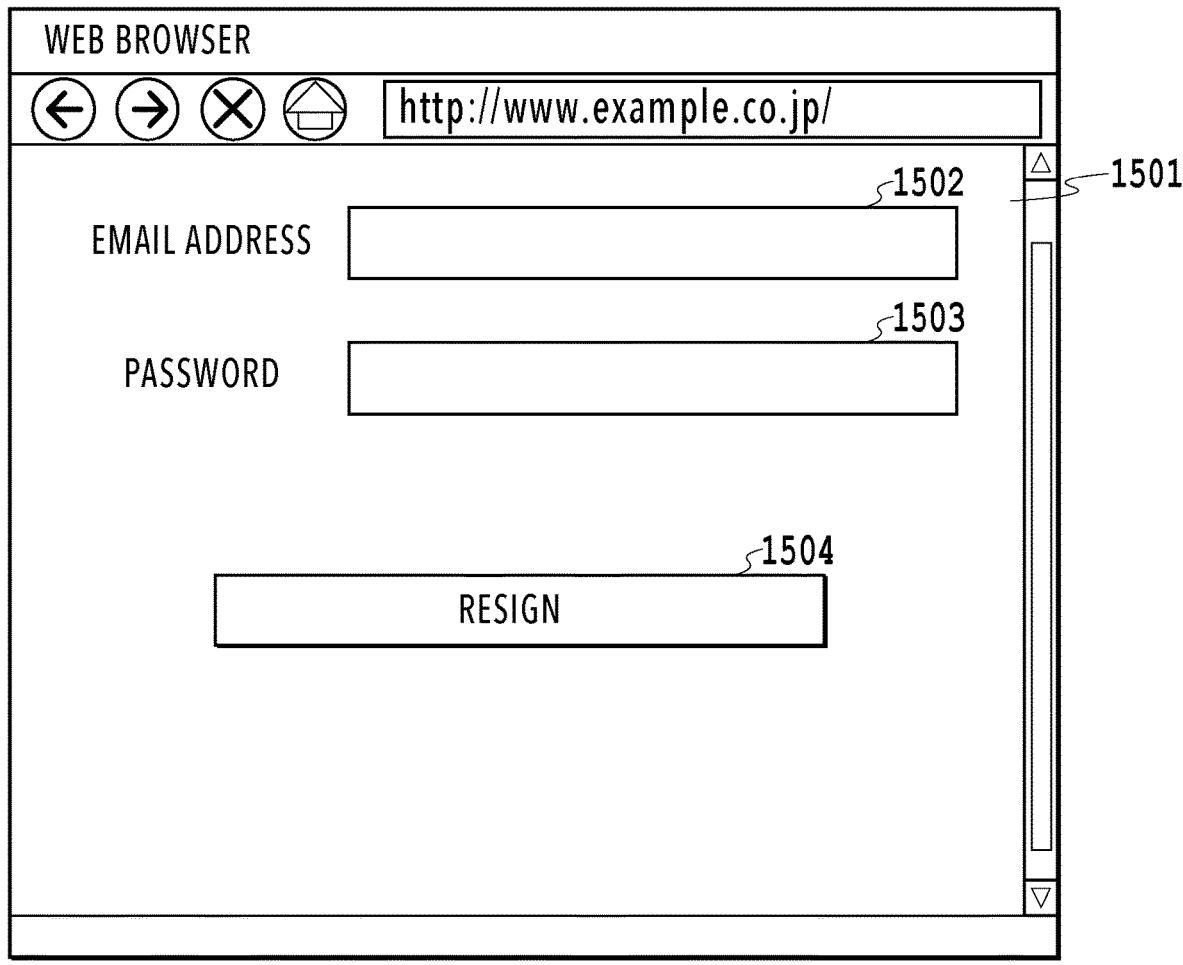
FIG. 15 is a diagram illustrating an exemplary GUI for resignation in embodiment 5.

FIG. 15 illustrates an exemplary GUI displayed based on screen information for resignation in this embodiment. A resignation page 1501 displayed on the web browser of the terminal apparatus 200 includes an email address input form 1502 and a password input form 1503. Further, a resign button 1504 is displayed on the resignation page 1501. In a case where the user inputs his or her email address and password into the respective input forms and then presses the resign button 1504, the service provision server 400 requests deletion of the user information. The service provision server 400 checks whether or not the email address and the password received from the terminal apparatus 200 are stored in the user information management database. In a case where the email address and the password are stored, the service provision server 400 requests the management server 500 to delete the printer ID associated with the user information. This process by the service provision server 400 requesting the management server 500 to delete the printer ID corresponds to an invalidation requesting unit configured to request invalidation of a printer ID. In response to this request, the database management program of the management server 500 deletes the printer ID notified of by the service provision server 400 from the printer ID management database. Then, upon notification of the deletion of the printer ID by the management server 500, the service provision server 400 also deletes the record of that printer ID from the user information management database.

As described above, according to the printer ID registration technique in this embodiment, in response to a request to delete user information, the user information and the printer ID associated with it can be deleted from the service provision server 400 and the management server 500. Thus, with printer ID registration technique in this embodiment, it is possible to properly manage printers ID and also avoid situations such as misuse of printer IDs that have been left unused.

Other Embodiments

In the above embodiments, the configuration in which the management server 500 is configured of a single information processing apparatus (computer) has been presented. However, the present invention is not limited to this. The management server 500 may be configured of a plurality of information processing apparatuses. In other words, a plurality of information processing apparatuses may perform distributed processing to implement the function of the management server 500.

Further, the management server 500 and the service provision servers 400 in the above embodiments provide different functions and are therefore configured of different information processing apparatuses. However, the present invention is not limited to this. For example, an integrated configuration may be employed in which a plurality of functions are implemented within a single information processing apparatus. Alternatively, a distributed configuration may be employed in which functions are distributed to and implemented within more servers.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention brings about an advantage that an apparatus to which to provide a web service can be easily registered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129183, filed Jun. 30, 2017, which is hereby incorporated by reference wherein in its entirety.

What is claimed is:

1. An information processing apparatus comprising:
at least one processor configured to cause the information processing apparatus to perform:
obtaining, from a same information processing apparatus, first identification information which is issued by a first server and is registered in a second server in association with any user information, and second identification information which is issued by the first server and is not associated with any user information and is not registered in the second server;
transmitting the obtained first identification information and the second identification information to the second server;
receiving screen information for inputting user information necessary for using a predetermined service, from the second server as a response to the transmission of the first identification information and the second identification information; and
transmitting a registration request including the user information, which is input on a screen provided based on the screen information, to the second server,
wherein the second identification information, which is obtained from the image processing apparatus by the information processing apparatus based on the registration request transmitted from the information processing apparatus and is transmitted from the information processing apparatus and is not registered in association with any user information, is newly registered in association with user information included in the transmitted registration request in the second server, and the first identification information, which is obtained from the image processing apparatus by the information processing apparatus and is transmitted from the information processing apparatus and is registered in association with any user information, is deleted from the first server.

2. The information processing apparatus according to claim 1, wherein the at least one processer further performs:
obtaining access permission information from the second server,
wherein the at least one processor transmits the access permission information to the image processing apparatus along with an instruction to request issuance of the identification information, or transmits the instruction to request issuance of the identification information to the image processing apparatus after incorporating the access permission information into the instruction to request issuance of the identification information.

3. The information processing apparatus according to claim 1, wherein the at least one processor further performs selecting an image processing apparatus from among one or more of the image processing apparatuses connected to the information processing apparatus through a communication network,
  wherein the identification information of the selected image processing apparatus is obtained.

4. The information processing apparatus according to claim 1, wherein
  the screen information represents a screen for registering the user information, and
  the at least one processor transmits the user information input and received through a GUI displayed based on the screen information to the second server.

5. A control method of an information processing apparatus, the control method comprising:
  obtaining, from a same information processing apparatus, first identification information which is issued by a first server and is registered in a second server in association with any user information, and second identification information which is issued by the first server and is not associated with any user information and is not registered in the second server;
  transmitting the obtained first identification information and the second identification information to the second server;
  receiving screen information for inputting user information necessary for using a predetermined service, from the second server as a response to the transmission of the first identification information and the second identification information; and
  transmitting a registration request including the user information, which is input on a screen provided based on the screen information, to the second server,
  wherein, the second identification information, which is obtained from the image processing apparatus by the information processing apparatus based on the registration request transmitted from the information processing apparatus and is transmitted from the information processing apparatus and is not registered in association with any user information is newly registered in association with user information included in the transmitted registration request in the second server, and the first identification information, which is obtained from the image processing apparatus by the information processing apparatus and is transmitted from the information processing apparatus and is registered in association with any user information, is deleted from the first server.

6. The control method according to claim 5, further comprising obtaining access permission information from the second server,
  wherein the access permission information is transmitted to the image processing apparatus along with an instruction to request issuance of the identification information, or the instruction to request issuance of the identification information is transmitted to the image processing apparatus after incorporating the access permission information into the instruction to request issuance of the identification information.

7. The control method according to claim 5, further comprising selecting an image processing apparatus from among one or more of the image processing apparatuses connected to the information processing apparatus through a communication network,
  wherein the identification information of the selected image processing apparatus is obtained.

8. The control method according to claim 5, wherein
  the transmission request contains screen information representing a screen for registering the user information, and
  the user information input and received through a GUI displayed based on the screen information is transmitted to the second server.

9. A system comprising an information processing apparatus and a first server,
  the information processing apparatus comprising at least one processor configured to cause the information processing apparatus to perform:
    obtaining, from a same information processing apparatus, first identification information issued by the first server and is registered in a second server in association with any user information, and second identification information which is issued by the first server and is not associated with any user information and is not registered in the second server;
    transmitting the obtained first identification information and the second identification information to the second server;
    receiving screen information for inputting user information necessary for using a predetermined service, from the second server as a response to the transmission of the first identification information and the second identification information; and
    transmitting a registration request including the user information, which is input on a screen provided based on the screen information, to the second server,
  the first server comprising at least one processor configured to cause the first server to perform:
    issuing the first identification information and the second identification information; and
  the second server comprising at least one processor configured to cause the second server to perform:
    receiving the first identification information and the second identification information transmitted from the information processing apparatus;
    transmitting the screen information to the information processing apparatus;
    receiving the registration request including the user information, which is input on a screen of the information processing apparatus provided based on the screen information, from the information processing apparatus,
  wherein, the second identification information, which is obtained from the image processing apparatus by the information processing apparatus based on the registration request transmitted from the information processing apparatus and is transmitted from the information processing apparatus and is not registered in association with any user information, is newly registered is association with the user information included in the transmitted registration request in the second server, and the first identification information, which is obtained from the image processing apparatus by the information processing apparatus and is transmitted from the information processing apparatus and is registered in association with any user information, is deleted from the first server.

* * * * *